(12) United States Patent
Wada et al.

(10) Patent No.: US 6,728,097 B2
(45) Date of Patent: Apr. 27, 2004

(54) SOLID ELECTROLYTIC CAPACITOR AND METHOD FOR MANUFACTURING THE SAME

(75) Inventors: Tomohide Wada, Kyoto (JP); Katsuyuki Nakamura, Hirakata (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 10/390,016

(22) Filed: Mar. 18, 2003

(65) Prior Publication Data

US 2003/0174462 A1 Sep. 18, 2003

(30) Foreign Application Priority Data

Mar. 18, 2002 (JP) ........................................ 2002-073605

(51) Int. Cl.7 ............................. H01G 4/228; H01G 9/04
(52) U.S. Cl. .................... 361/533; 29/25.03; 361/538; 361/528
(58) Field of Search ................................ 361/523–541; 29/25.03

(56) References Cited

U.S. PATENT DOCUMENTS

| | | | |
|---|---|---|---|
| 4,763,228 A * | 8/1988 | Su ............................ | 361/534 |
| 5,363,272 A * | 11/1994 | Tanaka et al. ............ | 361/534 |
| 6,188,566 B1 * | 2/2001 | Aoyama ................... | 361/534 |
| 6,229,687 B1 * | 5/2001 | Wada et al. .............. | 361/523 |
| 6,462,936 B1 * | 10/2002 | Fujimoto et al. ......... | 361/525 |

* cited by examiner

*Primary Examiner*—Dean A. Reichard
*Assistant Examiner*—Eric Thomas
(74) *Attorney, Agent, or Firm*—Parkhurst & Wendel, L.L.P.

(57) ABSTRACT

In a fixing portion against which an end surface of a capacitor element abuts is provided on a portion of a cathode lead frame covered with a casing resin, the distance through which external oxygen moves to reach the capacitor element is increased by the distance of the fixing portion, whereby probability of oxidation is remarkably reduced, thus oxidation hardly occurs in the capacitor element. Further, since the capacitor element can be reliably positioned by bringing its end into abutment against the fixing portion, assembly accuracy is largely improved and the capacitor can be made compact with ease.

9 Claims, 11 Drawing Sheets

SOLID ELECTROLYTIC CAPACITOR AND METHOD FOR MANUFACTURING THE SAME

FIELD OF THE INVENTION

The present invention relates to a solid electrolytic capacitor in which an electroconductive polymer is used as a solid electrolyte and a method for manufacturing the solid electrolytic capacitor.

BACKGROUND OF THE INVENTION

In recent years, with the development of electronic devices smaller in size and capable of operating at higher frequencies, solid electrolytic capacitors using an electroconductive polymer as a solid electrolyte capable of realizing a high-frequency and low-impedance characteristics have been introduced to the market as a capacitor for use in such electronic devices. Because of use of an electroconductive polymer of a high conductivity as a solid electrolyte, this kind of solid electrolytic capacitor has an equivalent series resistance (ESR) component smaller than that of conventional dry electrolytic capacitors using an electrolytic solution or solid electrolytic capacitors using manganese dioxide, and can therefore be realized as a solid electrolytic capacitor large in capacity, small in size and close to an ideal. Therefore this kind of solid electrolytic capacitor has undergone many improvements and a number of its variations have become available on the market.

FIG. 9 is a cross-sectional view of the structure of a conventional solid electrolytic capacitor of this kind, FIG. 10 is a partially cut-away perspective view of a capacitor element constituting the electrolytic capacitor, and FIG. 11 is a perspective view of the capacitor element in a single state connected to lead frames.

The capacitor element indicated by 1 in the figures is constituted by an anode member 2 and a cathode member 3. The anode member 2 is made of aluminum and has an insulating dielectric oxide film layer 1b formed on its external surface, and an insulating layer formed of polyimide adhesive tape 4 in a predetermined position on its electrode body 1a. The cathode member 3 is constituted by cathode layers: a solid electrolyte layer 1c formed of an electroconductive polymer, a carbon paint layer 1d, an electroconductive silver paint layer 1e, formed one on another.

The anode member 2 of the capacitor element 1 is joined to an anode lead frame 11 by a certain means, e.g., welding. The cathode member 3 of the capacitor element 1 is joined to a cathode lead frame 12 by a certain means, e.g., an electroconductive adhesive. The anode lead frame 11 has a joint member 11a provided at its end and bent so as to wrap round the anode member 2 at the joint end, thereby clamping the end of the anode member 2. By welded portions 11b in the joint member 11a, the end of the anode member 2 is fixed to the joint member 11a. Guide members 12a are provided on the cathode lead frame 12 to guide the cathode member 3. An insulating casing resin 13 covers the above-described capacitor element 1 with the anode lead frame 11 and the cathode lead frame 12 partially exposed.

Various electroconductive polymers have been developed which can be used as the solid electrolyte 1c in the conventional solid electrolytic capacitor constructed as described above. The development of applications of such polymers to solid electrolytic capacitors is being promoted.

However, it is known that any of electroconductive polymers usable as the solid electrolyte 1c degrades in an oxidizing atmosphere since it is an organic material. The casing resin 13 has a role to prevent oxidation of such solid electrolyte 1c. However, air enters through a small gap between contact surfaces of the cathode lead frame 12 and the casing resin 13 to cause a reduction in conductivity, a deterioration of adhesion to the dielectric oxide film, and a reduction in stability. It is known that, from this cause, deteriorations in capacitor characteristics (a reduction in capacity and an increase in equivalent series resistance in particular) are caused particularly under a high-humidity condition.

For the purpose of solving the above-described problem in conventional solid electrolytic capacitors of this kind, the surface of the cathode lead frame 12 in contact with the casing resin 13 in which the capacitor element 1 and a part of the cathode lead frame 12 are molded is roughened to improve the adhesion between the casing resin 13 molding a part of the cathode lead frame 12 and the cathode lead frame 12. Further, a trial has been made to prevent oxidation under an oxidizing atmosphere in such a manner that, as shown in FIG. 9, the distance B between the outer end of the casing resin 13 and the end of the capacitor element 1 on the cathode side is increased by increasing the thickness of the casing resin 13 on the cathode lead frame 12 side to maximize the distance through which the cathode lead frame 12 and the casing resin 13 contact each other.

The above-described conventional solid electrolytic capacitor, however, has an increased external size because of use of a method for increasing a distance through which the cathode lead frame 12 and the casing resin 13 contact each other by increasing the thickness of the casing resin 13 so that the distance B between the outer end of the casing resin 13 and the end of the capacitor element 1 increases. Therefore there is a problem that it is extremely difficult for the conventional solid electrolytic capacitor to be reduced in size. Because of this problem, it is not possible to meet the recent strict size reduction requirement on electronic devices such as portable telephones.

In a type of solid electrolytic capacitor in which a plurality of capacitor elements 1 are stacked on anode lead frame 11 and cathode lead frame, a positioning error occurs between the stacked capacitor elements and it is necessary to determine the size of casing resin 13 by factoring in such a positioning error. This means a further increase in the degree of difficulty in the size of the solid electrolytic capacitor.

DISCLOSURE OF THE INVENTION

In view of the above-described problem, an object of the present invention is to provide a solid electrolytic capacitor capable of limiting oxidation deterioration of a solid electrolyte under an oxidizing condition by reducing the probability of external oxygen reaching the capacitor element and also capable of being reduced in size by reducing the thickness of the casing resin, and a method for manufacturing the solid electrolytic capacitor.

To achieve the above-described object, according to the present invention, there is provided a solid electrolytic capacitor in which an anode member and a cathode member provided in a capacitor element are respectively connected to an anode lead frame and a cathode lead frame, and in which the capacitor element including parts of the anode lead frame and the cathode lead frame are covered with a casing resin, the capacitor having a stepped portion formed in the portion of the cathode lead frame covered with the casing resin, and a gap provided between a vertical part of the stepped portion and the end of the capacitor element on the cathode member side.

In the above-described construction, the distance through which external oxygen (oxygen in atmospheric air) entering the capacitor through the gap between the cathode lead frame and the casing resin moves to reach the capacitor element can be increased to reduce the probability of external oxygen reaching the capacitor element to an extremely small value. That is, intrusion of external oxygen can be limited to ensure that oxidation deterioration does not occur easily even in an oxidizing atmosphere or at a high temperature, and that stable capacitor characteristics can be obtained under such a condition.

Therefore there is no need to maximize the distance between the outer end of the casing resin and the end of the capacitor element on the cathode member side by increasing the thickness of the casing resin as in the conventional art. Consequently, the capacitor can easily be reduced in size.

In the solid electrolytic capacitor of the present invention, a fixing portion against which an end surface of the capacitor element on the cathode member side abuts is provided inside the vertical part of the stepped portion of the cathode lead frame.

In the above-described construction, the distance through which external oxygen moves to reach the capacitor element can be increased by the distance of the fixing portion, thereby reducing the probability of external oxygen reaching the capacitor element to an extremely small value and ensuring that the oxidation deterioration does not occur easily. Further, the capacitor element can be positioned with reliability by bringing its end on the cathode member side into abutment against the fixing portion to prevent occurrence of a positioning error, thereby effectively improving the assembly accuracy. Moreover, since there is no need to factor in a positioning error in designing, the size of the capacitor can be further reduced.

In the solid electrolytic capacitor of the present invention, the fixing portion may be formed integrally with the cathode lead frame by bending and raising part of the cathode lead frame. In this manner, each of the number of component parts and the number of assembly steps can be reduced to achieve a reduction in manufacturing cost. Also, the assembly accuracy is improved by integrally forming the fixing portion to stabilize the quality.

In the solid electrolytic capacitor of the present invention, the fixing portion may be formed separately from the cathode lead frame and may be formed from the same material as that of the cathode lead frame. If the fixing portion is formed in this manner, the affinity between contact surfaces of the fixing member and the cathode lead frame or between contact surfaces of the fixing member and the casing resin is improved to stabilize the strength of connection or joint therebetween.

In the solid electrolytic capacitor of the present invention, the vertical part of the stepped portion and the end of the capacitor element on the cathode member side may be spaced apart from each other by interposing a resin constituting the casing resin between the vertical part of the stepped portion and the end of the capacitor element. The need for the fixing portion or fixing member for positioning by abutment of the end of the cathode member of the capacitor element is thereby eliminated to simplify the structure and reduce the manufacturing cost.

In the solid electrolytic capacitor of the present invention, the cathode lead frame may be bent a certain number of times to be formed into a stepped shape having a plurality of steps. This arrangement ensures that the distance through which external oxygen moves to reach the capacitor element is further increased to reduce the probability of external oxygen reaching the capacitor element to an extremely small value and to ensure that oxidation deterioration does not occur easily.

In the solid electrolytic capacitor of the present invention, the capacitor element may be a stack of a plurality of capacitor elements. This arrangement ensures that a small-size large-capacity solid electrolytic capacitor can be assembled with accuracy.

According to the present invention, there is provided a method for manufacturing a solid electrolytic capacitor including a step of connecting an anode member provided on a capacitor element by placing the anode member on an anode lead frame, a step of connecting a cathode member of the capacitor element by placing the cathode member on a cathode lead frame so that an end surface of the capacitor element on the cathode member side abuts against a fixing portion standing upright on the cathode lead frame, and a step of covering the capacitor element including parts of the anode lead frame and the cathode lead frame with a casing resin. This method makes it possible to produce with stability a small-size large-capacity solid electrolytic capacitor in which oxygen deterioration does not occur easily, and which is capable of reliable positioning of the capacitor element and has improved assembly accuracy.

DESCRIPTION OF THE EMBODIMENTS

Embodiment 1

Embodiment 1 of the present invention will be described with reference to FIGS. 1 and 2.

Figure 1:
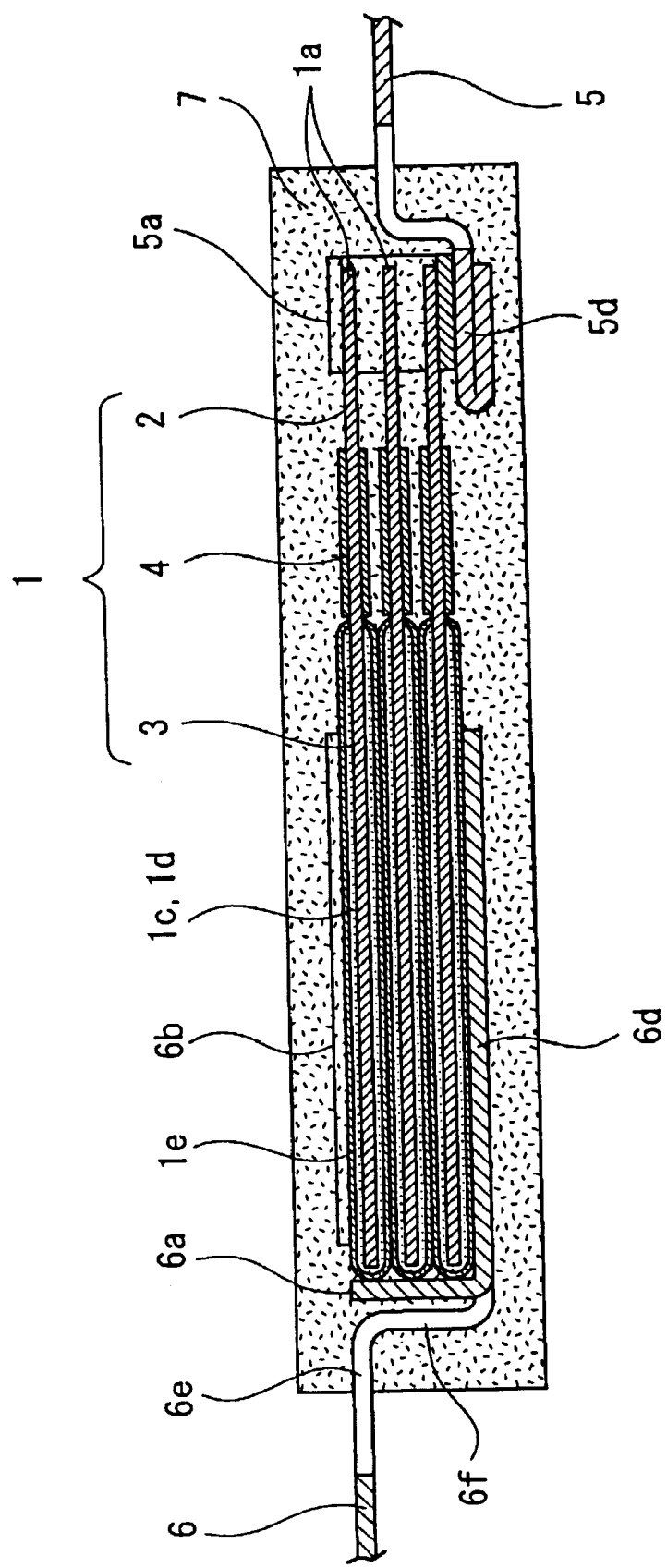
FIG. 1 is a cross-sectional view of a structure of a solid electrolytic capacitor according to Embodiment 1 of the present invention.

FIG. 1 is a cross-sectional view of the structure of a solid electrolytic capacitor according to Embodiment 1 of the present invention, in which three capacitor elements are stacked. FIG. 2 is a perspective view of a simplified state of the electrolytic capacitor in which only one capacitor element is connected to lead frames.

Figure 2:
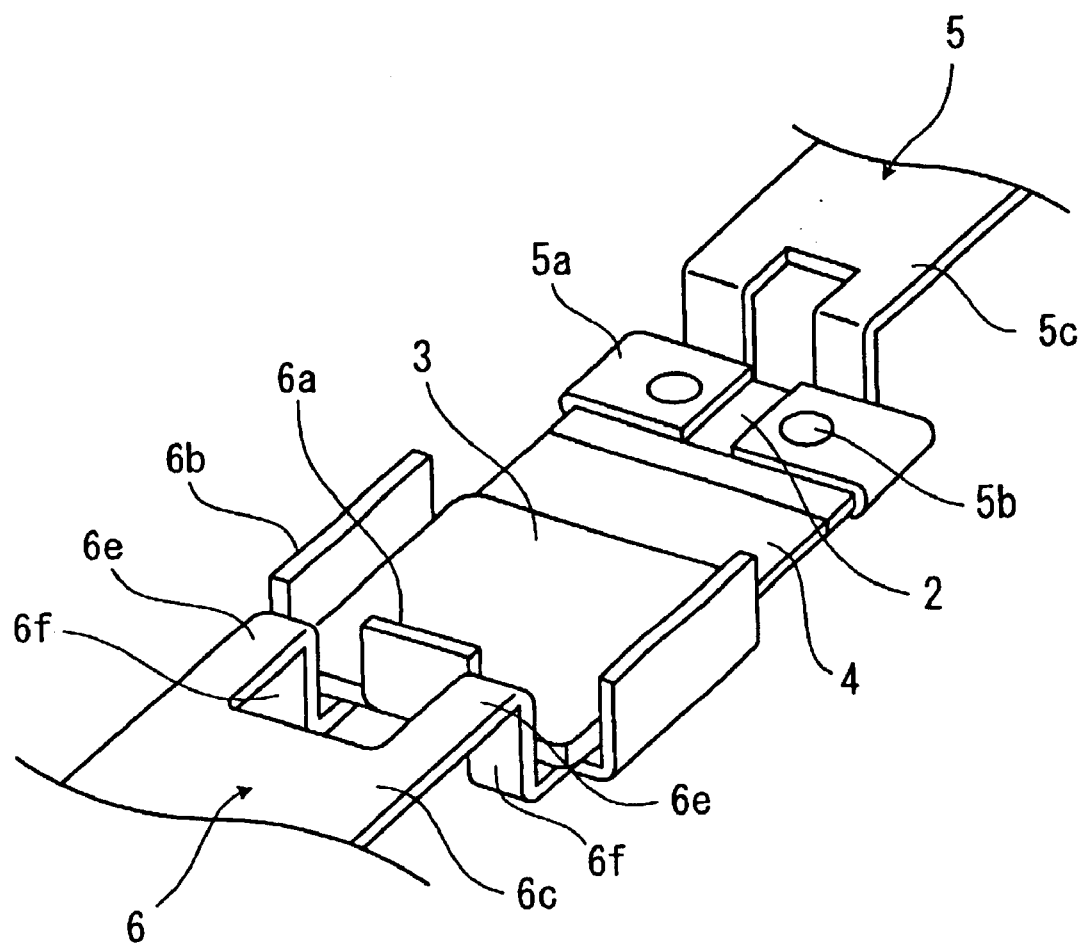
FIG. 2 is a perspective view of lead frames to which one capacitor element is connected.

Referring to FIGS. 1 and 2, the solid electrolytic capacitor has capacitor elements 1, anode and cathode lead frames 5 and 6 to which the capacitor elements 1 are connected, and an insulating casing resin 7 with which the capacitor elements 1 are covered, parts of the anode lead frame 5 and the cathode lead frame 6 being exposed out of the resin.

Figure 7:
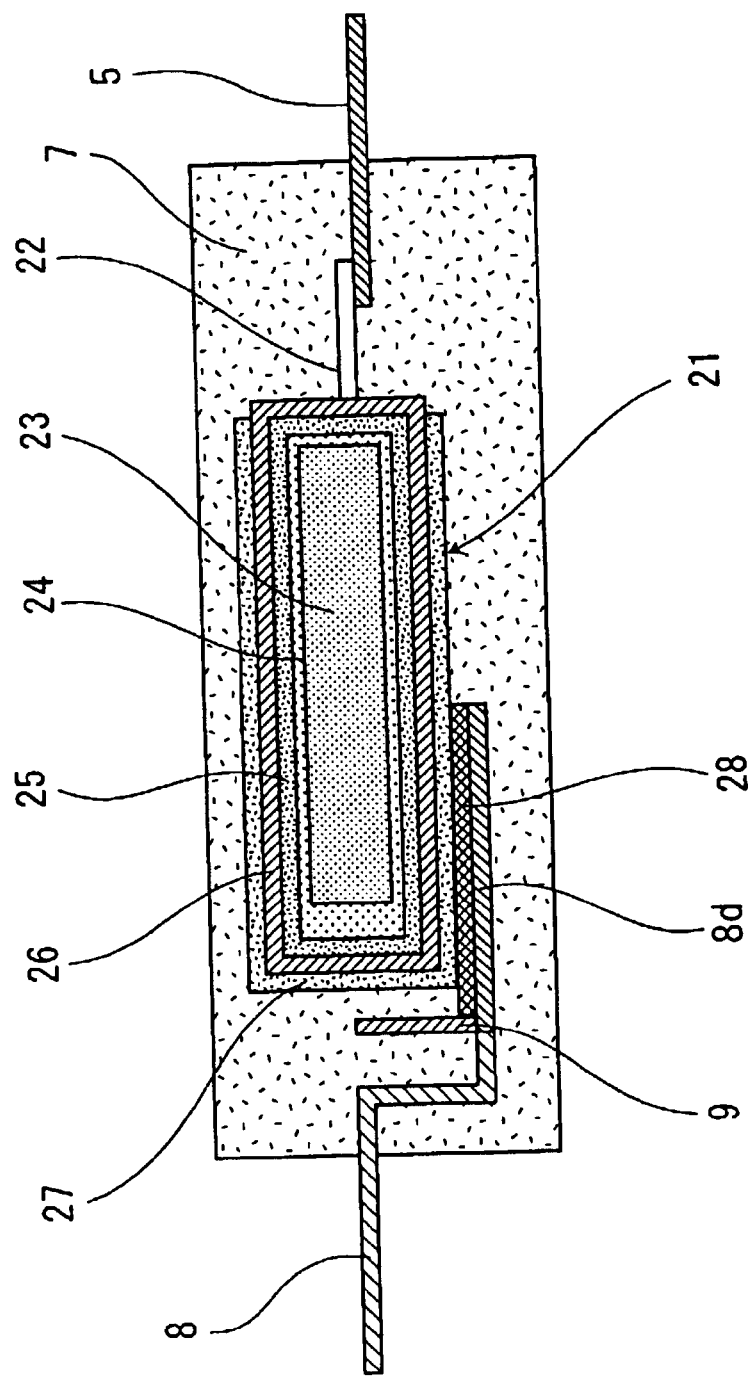
FIG. 7 is a cross-sectional view of a structure of a solid electrolytic capacitor according to Embodiment 5 of the present invention.

Each of the capacitor elements 1 has the same construction as that shown in FIG. 7. An electrode member 1a forms a main portion of the capacitor element 1. The surface of the electrode member 1a made of aluminum having a purity of 99.9% is roughened by electrolytic etching based on a well-known method and the electrode member 1a then undergoes a chemical conversion treatment (formation) performed for 30 minutes in an aqueous solution of ammonium adipate having a concentration of 3% by applying a voltage of 10 V. A compound film 1b made of aluminum oxide is thereby formed as a dielectric on the surface of the electrode member 1a.

The electrode member 1a thus made is cut into a piece having a width of 3.5 mm and a length of 6.5 mm. A polyimide adhesive tape 4 is adhered to each of front and rear back surfaces of the electrode member 1a at a predetermined position to form an insulating layer as a boundary between an anode member 2 and a cathode member 3, and a chemical conversion treatment is again performed on cut surface portions for 30 minutes in an aqueous solution of ammonium adipate having a concentration of 3% by applying a voltage of 10 V. Thereafter, the cathode member 3 is dipped in an aqueous solution of manganese nitrate and manganese nitrate is thermally cracked at 300° C. to form an electroconductive manganese oxide layer on the cathode member 3. Further, the cathode member 3 is immersed in an aqueous solution containing 0.1 mol of pyrrole and 0.15 mol of alkylnaphthalenesulfonate and electrolytic polymerization is performed for 30 minutes by bringing a working electrode into contact with a portion of the manganese oxide layer and applying a constant voltage of 2 V, thereby causing a conductive polymer formed of polypyrrole to precipitate uniformly to form a solid electrolyte layer 1c. A cathode layer formed of a carbon paint layer 1d and an electroconductive silver paint layer 1e is formed on the cathode member made as described above. The capacitor element 1 having the electroconductive polymer as a solid electrolyte is thus constructed.

The anode lead frame 5 is a member formed by pressing for continuously punching a phosphor bronze plate having a thickness of 0.1 mm and by bending for forming the punched member into a predetermined shape with a press die. The anode lead frame 5 is bent upwardly at the outer end of a flat portion 5d on which the anode member 2 of the capacitor element 1 is placed. The anode lead frame 5 is thereby bent so as to be L-shaped. The anode lead frame 5 is further bent outwardly so as to be inversely L-shaped and extend horizontally. Thus, the anode lead frame 5 is formed into a stepped shape. The portion of the anode lead frame 5 extending horizontally outward is used as an external anode terminal 5c described below. Joint portion 5a is formed to protrude on opposite sides at the inner end of the anode lead frame 5. The joint portion 5a is bent to wrap round the anode member 2 after the anode member 2 of the capacitor element 1 has been mounted on the flat portion 5d of the anode lead frame 5. (A state in which only one capacitor element 1 is mounted is shown in FIG. 2 for simplification of illustration but, in actuality, a plurality of capacitor elements 1 are stacked as shown in FIG. 1. Also, FIG. 1 illustrates a plurality of anode members 2 in a separate state in FIG. 1 but they are, in actuality, maintained in pressure contact with each other by the joint portion 5a.) The anode member 2 of the capacitor element 1 and the anode lead frame 5 are joined to each other by performing laser welding at welded portions 5b.

The cathode lead frame 6 is formed by pressing for continuously punching a phosphor bronze plate having a thickness of 0.1 mm and by bending for forming the punched member into a predetermined shape with a press die, as is the anode lead frame 5. That is, the cathode lead frame 6 is also formed into a stepped shape by being bent outward. The portion extending outward is used as an external cathode terminal 6c described below.

The cathode lead frame 6 shown in FIGS. 1 and 2 has stepped portions 6e between which a large punched opening is formed, and a flat portion 6d on which the cathode member 3 of the above-described capacitor element 1 is mounted. The flat portion 6d and the external cathode terminal 6c are connected in series by the pair of stepped portions 6e bent into a stepped shape. The cathode lead frame 6 also has portions in the form of rectangular plates, which are formed by being extended from the opposite sides of the flat portion 6d. The portions in the form of rectangular plates are perpendicularly bent upward to form guide portions 6b for guiding the cathode member 3 of the capacitor element 1. Further, a fixing portion 6a in the form of a square plate is formed by being extended from the outer end of the flat portion 6d while being perpendicularly bent upward. The fixing portion 6a is formed by pressing of the same phosphor bronze plate as that from which the flat portion 6d and the external cathode terminal 6c are formed. That is, the fixing portion 6a is formed by punching the plate and by being raised in bending to so as stand upright as viewed in the figures. The fixing portion 6a stands inside vertical parts 6f of the stepped portions 6e, as shown in FIG. 1.

The cathode member 3 of the above-described capacitor element 1 is fitted between the guide portions 6b, 6b and is positioned with its end brought into abutment against the fixing portion 6a. In this state, the silver paint layer 1e, i.e., the cathode layer, is joined to the surface of the flat portion 6d by using an electroconductive adhesive (not shown). Further, a plurality of capacitor elements are stacked by applying the electroconductive adhesive to the capacitor elements 1. After stacking and joining of the plurality of capacitor elements 1 on the anode lead frame 5 and the cathode lead frame 6 performed as described above, the capacitor elements 1 are covered with the insulating casing resin 7 (epoxy resin) with the anode lead frame 5 and the cathode lead frame 6 partially exposed out of the casing resin 7, respectively. The portions of the anode lead frame 5 and the cathode lead frame 6 projecting out of the casing resin 7 are bent (not shown) along side and bottom surfaces of the casing resin 7, thus constructing a surface mount type of solid electrolytic capacitor having the external anode terminal 5c and the external cathode terminal 6c provided at the bottom surface.

In the solid electrolytic capacitor thus constructed, the vertical parts 6f of the stepped portions 6e and the ends of the cathode members 3 can be spaced apart from each other by the fixing portion 6a positioned inside the vertical parts 6f constituting the stepped portions 6e, as shown in FIG. 1. In this manner, the distance through which external oxygen (oxygen in atmospheric air) entering the capacitor through the gap between the external cathode terminal 6c and the casing resin 7 moves to reach the capacitor elements 1 can be increased to reduce the probability of external oxygen reaching the capacitor elements 1 to an extremely small value. That is, intrusion of external oxygen can be limited to ensure that the solid electrolyte layer 1c of the electroconductive polymer does not easily deteriorate by oxidation even in an oxidizing atmosphere or at a high temperature, and that stable capacitor characteristics can be obtained under such a condition. Therefore there is no need to maximize the distance between the end of the capacitor element 1 on the cathode member 3 side and the outer end of the casing resin 7 by increasing the thickness of the casing resin 7 as in the conventional art. Consequently, the solid electrolytic capacitor can easily be reduced in size.

Because of the construction in which the ends of the cathode members of the capacitor elements 1 brought into abutment against the fixing portion 6a provided on the cathode lead frame 6, substantially no error occurs in positioning of a plurality of capacitor elements 1 when the capacitor elements 1 are stacked, and the capacitor can be assembled with improved accuracy. Also, since there is no need to factor in a positioning error in designing, the size of the capacitor can be further reduced. Further, since the fixing portion 6a is formed integrally with the cathode lead frame 6, each of the number of component parts and the number of manufacturing steps is not increased and no increase in manufacturing cost results.

Embodiment 2

Embodiment 2 of the present invention will be described with reference to FIG. 3.

A solid electrolytic capacitor according to this embodiment differs from the solid electrolytic capacitor described above as Embodiment 1 in the construction of the cathode lead frame. In other respects, this embodiment is the same as Embodiment 1. The portions of this embodiment identical or corresponding to those of Embodiment 1 are indicated by the same reference characters, and detailed description for them will not be repeated. Detailed description of different portions only will be made with reference to FIG. 3.

Figure 3:
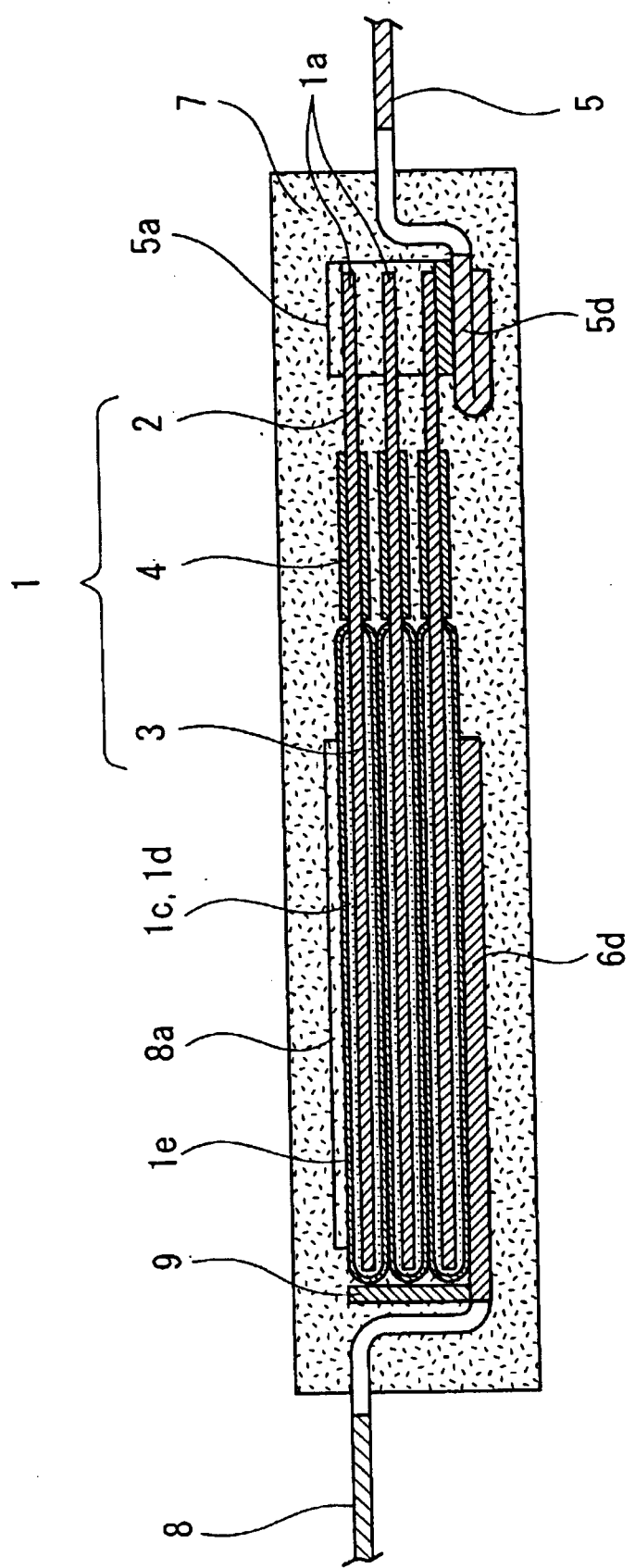
FIG. 3 is a cross-sectional view of a structure of a solid electrolytic capacitor according to Embodiment 2 of the present invention.

Referring to FIG. 3, the solid electrolytic capacitor has a cathode lead frame 8, guide portions 8a formed so as to stand upright from opposite side portions of the cathode lead frame 8 for the purpose of guiding the cathode members 3 of capacitor elements 1, and a fixing member 9 for positioning the cathode members 3 of the capacitor elements 1. The cathode member 3 of each capacitor element 1 is positioned by being brought into abutment against the fixing member 9. The fixing member 9 may be formed from the same material as the material of the cathode lead frame 8 or the casing resin 7. However, this fixing member 9 differs from the fixing portion in Embodiment 1 in that it is not formed integrally with the cathode lead frame 8.

The thus-constructed solid electrolytic capacitor of this embodiment is assembled, for example, by a method of joining the fixing member 9 on the cathode lead frame 8 at a predetermined position in advance (by a joining method not particularly specified) and thereafter stacking a plurality of capacitor elements 1, or a method of joining the fixing member 9 to the ends of the cathode members 3 of a plurality of capacitor elements 1 in a state where the capacitor elements 1 are stacked.

In the thus-constructed solid electrolytic capacitor of this embodiment, the distance through which external oxygen (oxygen in atmospheric air) moves to reach the capacitor elements 1 can be increased by using the fixing member 9 to limit intrusion of external oxygen, as in the solid electrolytic capacitor in Embodiment 1. Therefore, deterioration by oxidation does not occur easily even in an oxidizing atmosphere or at a high temperature, stable capacitor characteristics can be obtained under such a condition, and the solid electrolytic capacitor can easily be reduced in size.

Also, the fixing member 9 is formed independently to avoid forming the cathode lead frame 8 into a complicated shape and to enable use of various assembly methods.

Embodiment 3

Embodiment 3 of the present invention will be described with reference to FIG. 4.

A solid electrolytic capacitor according to this embodiment differs from the solid electrolytic capacitor described above as Embodiment 1 in the construction of the cathode lead frame. In other respects, this embodiment is the same as Embodiment 1. The portions of this embodiment identical or corresponding to those of Embodiment 1 are indicated by the same reference characters, and detailed description for them will not be repeated. Detailed description of different portions only will be made with reference to FIG. 4.

Figure 4:
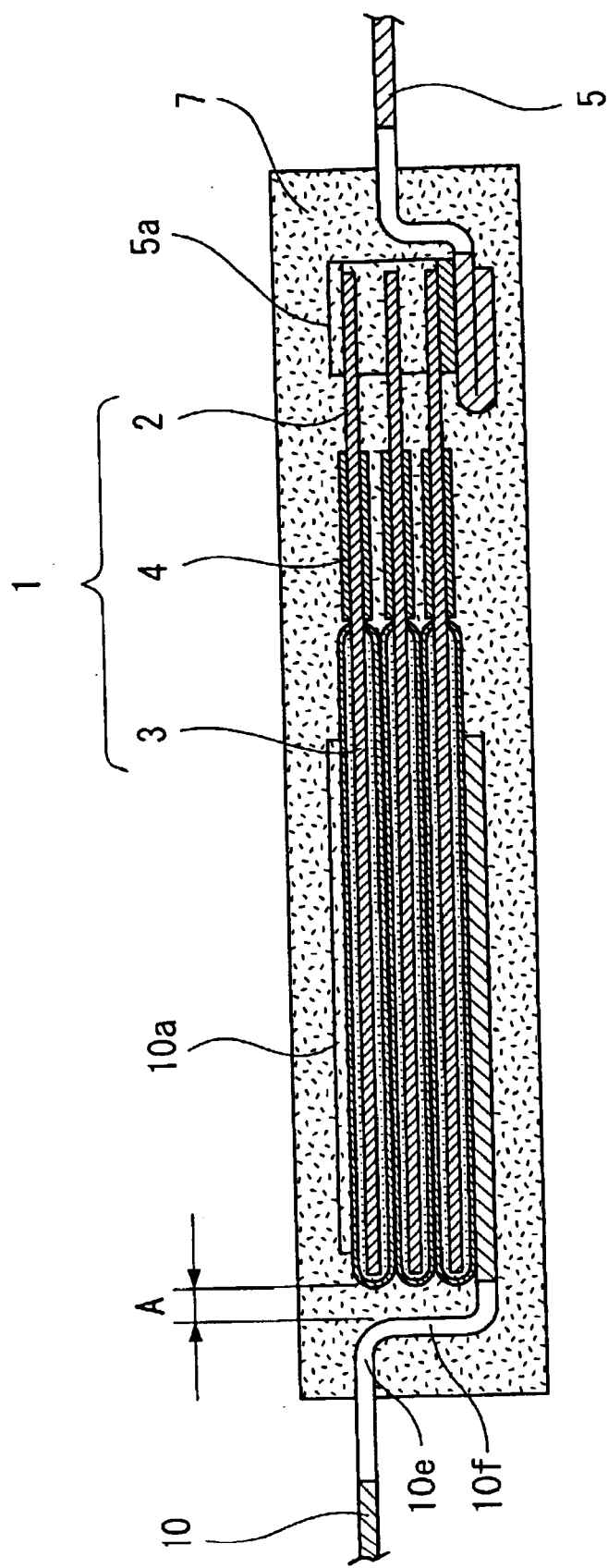
FIG. 4 is a cross-sectional view of a structure of a solid electrolytic capacitor according to Embodiment 3 of the present invention.

Referring to FIG. 4, the solid electrolytic capacitor has a cathode lead frame 10 and guide portions 10a formed so as to stand upright from opposite side portions of the cathode lead frame 10 for the purpose of guiding the cathode members 3 of capacitor elements 1. This solid electrolytic capacitor is assembled in such a manner that a plurality of capacitor elements 1, which are stacked in advance with a jig not shown in the form of a plate placed at a predetermined position on the cathode lead frame 10 (for example, at a position inside vertical parts 10f constituting stepped portions 10e of the cathode lead frame 10), are joined to the cathode lead frame 10 by an electroconductive adhesive while being maintained in abutment against the jig, and the jig is removed after joining. A predetermined gap A is thereby maintained between the vertical parts 10f of the cathode lead frame 10 and the ends of the cathode members 3 of the capacitor elements 1. A limited gap A may suffice if the vertical parts 10f of the cathode lead frame 10 and the ends of the cathode members 3 of the capacitor elements 1 are separated from each other by a resin constituting the casing resin 7 while expelling air from the spacing therebetween. It is not necessary to increase the gap A if this condition is satisfied.

In the thus-constructed solid electrolytic capacitor of this embodiment, the distance through which external oxygen (oxygen in atmospheric air) moves to reach the capacitor element 1 can be increased by the gap A provided between the vertical part 10f of the cathode lead frame 10 and the end of the cathode member 3 of the capacitor element 1 to limit intrusion of external oxygen, as in the solid electrolytic capacitor in Embodiment 1. In this solid electrolytic capacitor, therefore, deterioration by oxidation does not occur easily, stable capacitor characteristics can be obtained under such a condition, and a reduction in size can easily be achieved.

Also, the need for the fixing portion 6a or the fixing member 9 for positioning by abutment of the end surfaces of the cathode members 3 as in Embodiment 1 or 2 is eliminated to simplify the structure of the capacitor. The manufacturing cost of the capacitor is thereby reduced.

Figure 5:
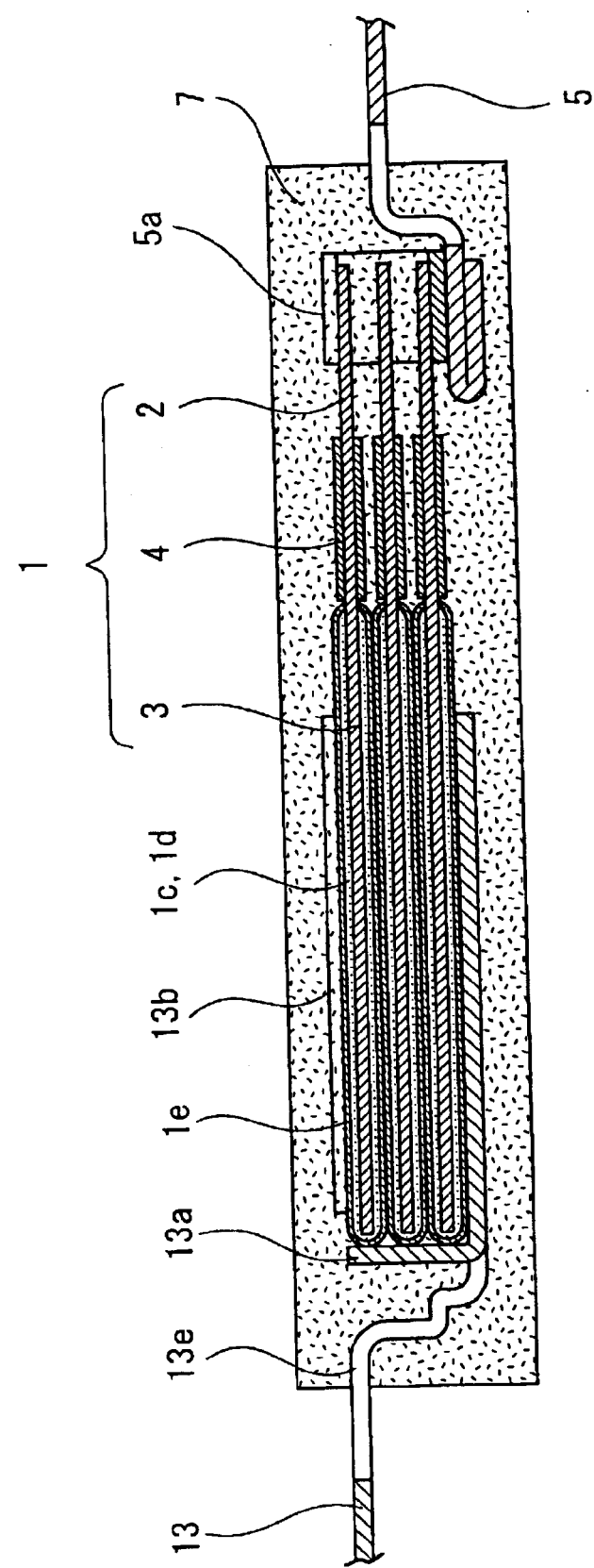
FIG. 5 is a cross-sectional view of a structure of a solid electrolytic capacitor according to another embodiment of the present invention.

FIG. 5 is a cross-sectional view of another embodiment of the present invention. Referring to FIG. 5, the solid electrolytic capacitor has a cathode lead frame 13, a fixing portion 13a for positioning by abutment of the cathode members 3 of the capacitor elements 1, and guide portions 13b formed so as to stand upright from opposite side portions of the cathode lead frame 13 for the purpose of guiding the cathode members 3 of the capacitor elements 1.

In this embodiment, each of stepped portions 13e of the cathode lead frame 13 is formed into a plurality of steps (two steps). A plurality of steps are formed in stepped portions 13e in this manner to increase the distance through which external oxygen entering the capacitor through the gap between the external lead frame 13 and the casing resin 7 moves to reach the capacitor elements 1, thereby reducing the probability of external oxygen reaching the capacitor elements 1. That is, also in this embodiment, intrusion of external oxygen can be limited to ensure that the solid electrolyte layer 1c of the electroconductive polymer does not easily deteriorate by oxidation even in an oxidizing atmosphere or at a high temperature, and that stable capacitor characteristics can be obtained under such a condition.

In this embodiment, the fixing portion 13a formed integrally with the cathode lead frame 13 is provided. However, the fixing portion 13a may be provided as a separate fixing member, as is that in Embodiment 2, or no fixing portion 13a or fixing member may be provided, as in Embodiment 3.

Embodiment 4

Embodiment 4 will be described.

The kind of capacitor element in a solid electrolytic capacitor according to this embodiment differs from that in the solid electrolytic capacitor described as Embodiment 1. In other respects, this embodiment is the same as Embodiment 1. The portions of this embodiment identical or corresponding to those of Embodiment 1 are indicated by the same reference characters, and detailed description for them will not be repeated. Detailed description of different portions only will be made with reference to FIG. 6.

Figure 6:
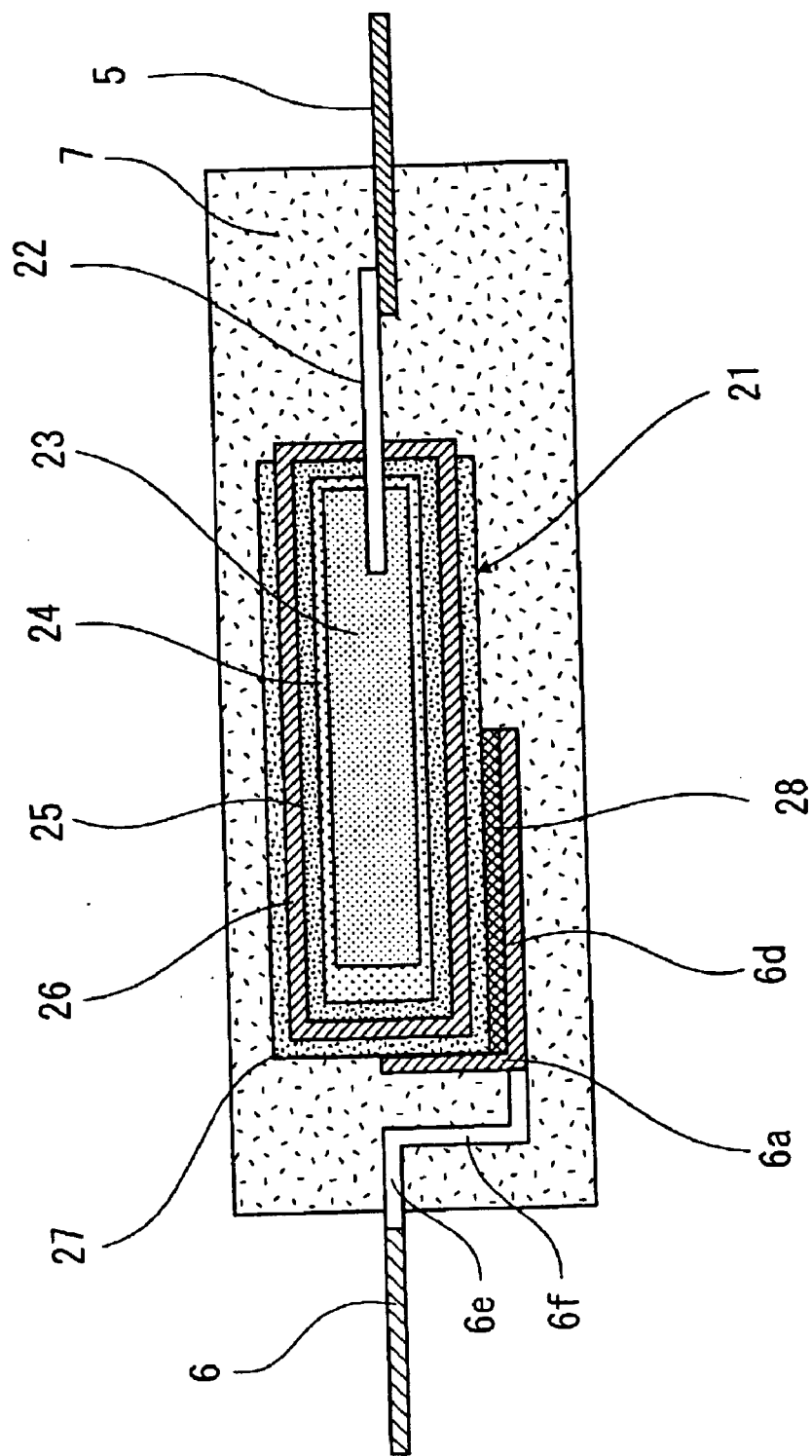
FIG. 6 is a cross-sectional view of a structure of a solid electrolytic capacitor according to Embodiment 4 of the present invention.

FIG. 6 is a cross-sectional view of the structure of a solid electrolytic capacitor according to Embodiment 4 of the present invention. In FIG. 6, capacitor element is indicated by 21. A process for making this capacitor element 21 will be described.

First, in a forming and sintering step in the process of making this capacitor element 21, a tantalum metal powder is formed into a compact of a desired shape by pressing while an anode lead wire 22 made of tantalum is embedded in the compact. The compact is then sintered to make a porous anode member 23.

Next, in a chemical conversion step, an anodizing treatment is performed by using phosphoric acid to form a compound film 24 on the external surface of the anode member 23.

Next, in a first solid electrolyte layer forming step, a pyrrole monomer solution is uniformly dispersed in the external surfaces and pores of the anode member 23 and the anode member 23 is thereafter brought into contact with an oxidizing solution, or the oxidizing solution is uniformly dispersed in the external surfaces and pores of the anode member 23 and the anode member 23 is thereafter brought into contact with the pyrrole monomer solution. In this manner, an electroconductive polymer layer 25 of polypyrrole is formed by chemical oxidative polymerization.

As the pyrrole monomer solution, a solution prepared by dissolving 0.1 mol/l of pyrrole and 0.25 mol/l of alkylnaphthalenesulfonate provided as a dopant in an aqueous solution containing 10 wt % of ethylene glycol is used. As the oxidizing solution, a solution prepared by dissolving 0.75 mol/l of ferrous sulfate provided as an oxidizer, 0.05 mol/l of alkylnaphthalenesulfonate provided as a dopant, and 0.75 mol/l of sulfuric acid in an aqueous solution containing 10 wt % of ethylene glycol is used.

A residue generated at the time of formation of the electroconductive polymer layer 25 to remain on the electroconductive polymer layer 25 is removed by cleansing. The electroconductive polymer layer 25 cleared of the residue is dried. The pure electroconductive polymer layer 25 formed of pyrrole is thereby formed on the film 24.

Next, in a cathode forming step, a cathode layer including a carbon paint layer 26 and a silver paint layer 27 is formed on the above-described electroconductive polymer layer 25, thus forming the capacitor element 21.

In an assembly step, the anode lead wire 22 of the above-described capacitor element 21 is joined by welding to the anode lead frame 5. Further, am in Embodiment 1, the capacitor element 21 is fitted between the guide portions (not shown) and the end surface of the capacitor element 21 is brought into abutment against the fixing portion 6a to position the capacitor element 21. In this state, the silver paint layer 27 in the cathode layer is joined to the surface of the flat portion 6d of the cathode lead frame 6 by an electroconductive adhesive 28.

Next, in a molding step, the capacitor element 21 is molded in epoxy casing resin 7 so that portions of the anode lead frame 5 and the cathode lead frame 6 are respectively exposed out of the external surface. Finally, the molded member is cut into individual pieces, followed by checking of each piece. Thus, capacitors are completed.

In the solid electrolytic capacitor of this embodiment thus constructed, the vertical part 6f of the stepped portion 6e and the end of the cathode member of the capacitor element 21 can be spaced apart from each other by the fixing portion 6a positioned inside the vertical part 6f constituting the stepped portion 6e. Thus, in the same manner as in Embodiment 1, the distance through which external oxygen entering the capacitor through the gap between the cathode lead frame 6 and the casing resin 7 moves to reach the capacitor element 21 can be increased to reduce the probability of external oxygen reaching the capacitor element 21 to an extremely small value. That is, the solid electrolyte layer 25 of the electroconductive polymer does not easily deteriorate by oxidation and stable capacitor characteristics can be obtained. Therefore there is no need to maximize the distance of contact between the cathode lead frame 6 and the casing resin 7 by increasing the thickness of the casing resin 7 as in the conventional art. Consequently, the solid electrolytic capacitor can easily be reduced in size.

Embodiment 5

A solid electrolytic capacitor according to this embodiment was made by using the capacitor element 21 described in the description of Embodiment 4 and the cathode lead frame 8 in Embodiment 2. Portions of this embodiment identical or corresponding to those in the above-described embodiments are indicated by the same reference characters, and detailed description for them will not be repeated.

FIG. 7 is a cross-sectional view of the structure of a solid electrolytic capacitor according to Embodiment 5 of the present invention. In FIG. 5, the fixing member is indicated by 9. This fixing member 9 differs from the fixing portion in Embodiment 4 in that it is not formed integrally with the cathode lead frame 8.

In assembly of the thus-constructed solid electrolytic capacitor of this embodiment, the fixing member 9 is joined to the cathode lead frame 8 at a predetermined position, and the silver paint layer 27 in the cathode layer of the capacitor element 21 is joined to the surface of the flat portion 8d of the cathode lead frame 8 by electroconductive adhesive 28.

The thus-constructed solid electrolytic capacitor of this embodiment has the same advantages as those in Embodiment 2.

Embodiment 6

A solid electrolytic capacitor according to this embodiment was made by using the capacitor element 21 described in the description of Embodiment 4 and the same cathode lead frame as that in Embodiment 3.

The thus-constructed solid electrolytic capacitor of this embodiment has the same advantages as those in Embodiment 3.

Long-term reliability test was made on the solid electrolytic capacitors constructed as described above according to Embodiments 1 to 6 and on the conventional solid electrolytic capacitor by soldering the solid electrolytic capacitor to a circuit board by reflow soldering performed in a high-temperature atmosphere of 270° C. for 2 minutes and by operating the capacitor in a high-temperature atmosphere of 125° C. for 1000 hours while applying a rated voltage of 6.3 V. As results of this test, changes in electrostatic capacity (%) and tanσ values (%) after 500 hours in the 125° C. atmosphere and after 1000 hours in the 125° C. atmosphere are shown in Tables 1 and 2. The numeric values shown in Tables 1 and 2 are average values of n=10 number of test samples.

TABLE 1

| | Initial characteristics | | 125° C., 500 hours | | | 125° C., 1000 hours | | |
|---|---|---|---|---|---|---|---|---|
| | Initial capacity ($\mu$F) | Initial tanσ (%) | Electro static capacity ($\mu$F) | Change in capacity (%) | tanσ (%) | Electro static capacity ($\mu$F) | Change in capacity (%) | tanσ (%) |
| Embodiment 1 | 46.8 | 1.3 | 45.8 | 2.1 | 1.3 | 45.4 | −2.9 | 2.2 |
| Embodiment 2 | 47.3 | 1.2 | 46.4 | −1.9 | 1.3 | 45.8 | −3.1 | 2.3 |
| Embodiment 3 | 47.8 | 1.2 | 46.6 | −2.5 | 1.2 | 46.3 | −3.1 | 2.5 |
| Conventional item | 47.4 | 1.2 | 44.7 | −5.6 | 3.5 | 41.9 | −11.5 | 12.7 |

TABLE 2

| | Initial characteristics | | 125° C., 500 hours | | | 125° C., 1000 hours | | |
|---|---|---|---|---|---|---|---|---|
| | Initial capacity ($\mu$F) | Initial tanσ (%) | Electro static capacity ($\mu$F) | Change in capacity (%) | tanσ (%) | Electro static capacity ($\mu$F) | Change in capacity (%) | tanσ (%) |
| Embodiment 4 | 151.8 | 1.3 | 148.3 | −2.3 | 1.5 | 148.2 | −2.4 | 2.5 |
| Embodiment 5 | 153.4 | 1.4 | 149.7 | −2.4 | 1.6 | 149.4 | −2.6 | 3.0 |
| Embodiment 6 | 152.7 | 1.3 | 148.9 | −2.5 | 1.6 | 148.3 | −2.9 | 2.9 |
| Conventional item | 150.3 | 1.4 | 143.7 | −4.4 | 3.2 | 133.9 | −10.9 | 10.9 |

Figure 8:
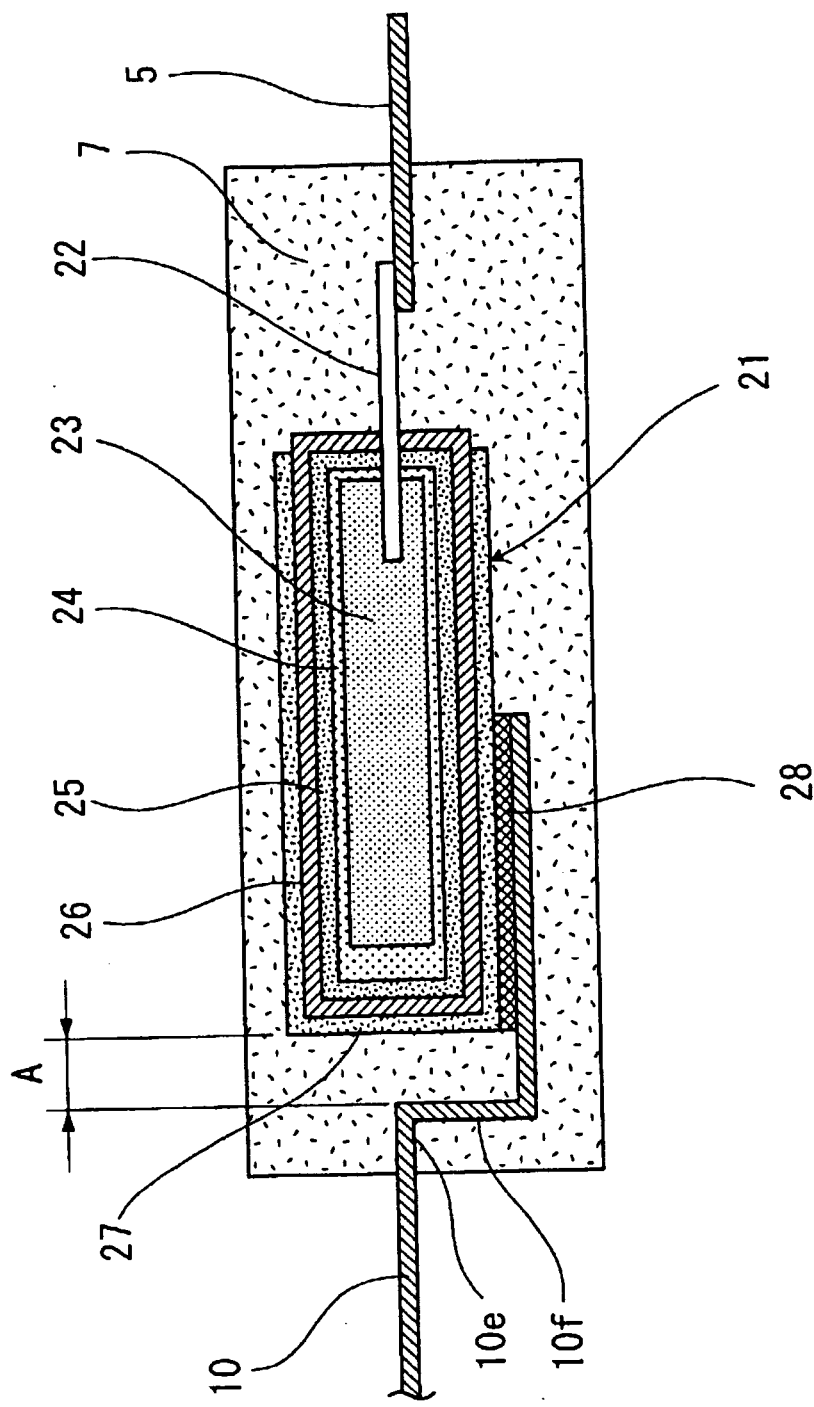
FIG. 8 is a cross-sectional view of a structure of a solid electrolytic capacitor according to Embodiment 6 of the present invention.
Figure 9:
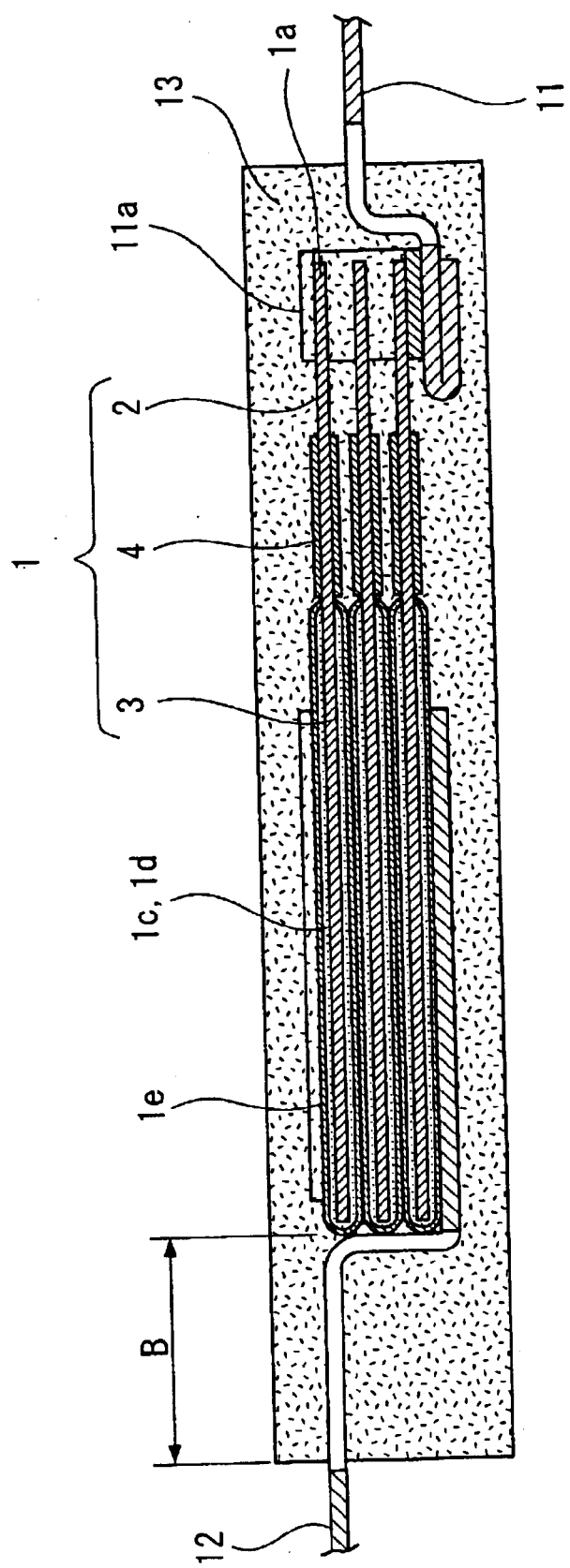
FIG. 9 is a cross-sectional view of a structure of a solid electrolytic capacitor according to a prior art.
Figure 10:
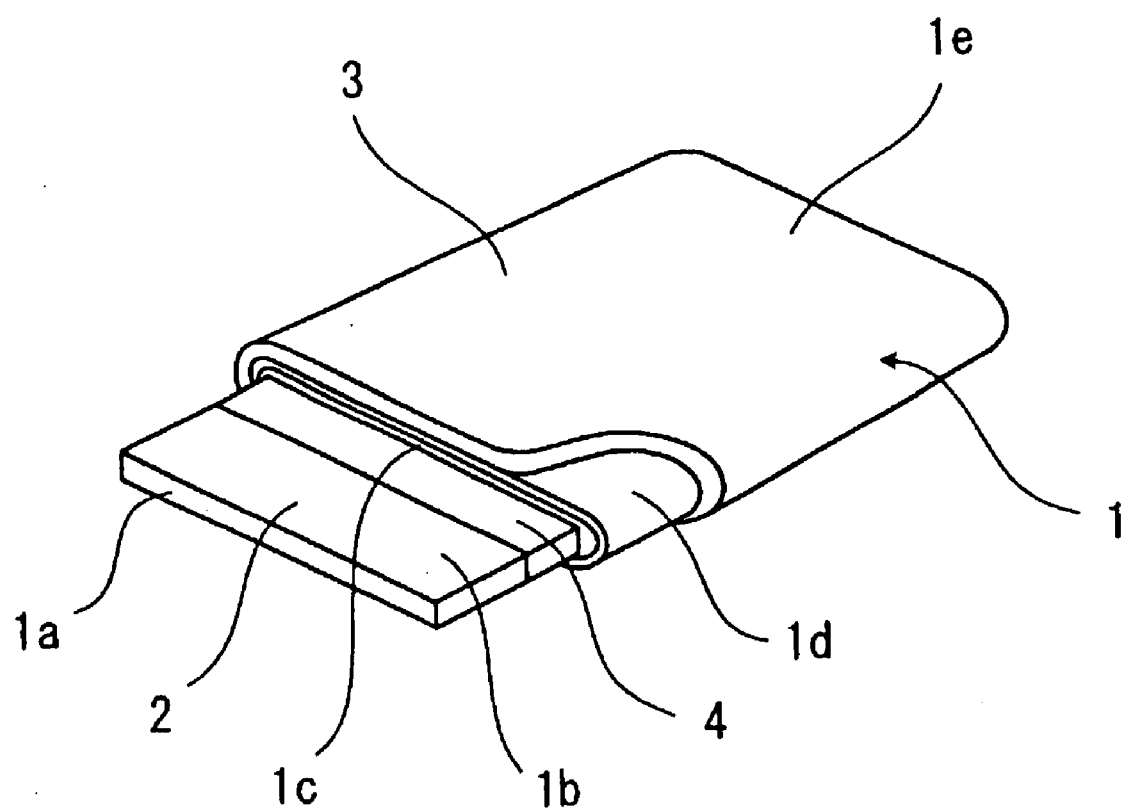
FIG. 10 is a partially cut-away perspective view of a capacitor element.
Figure 11:
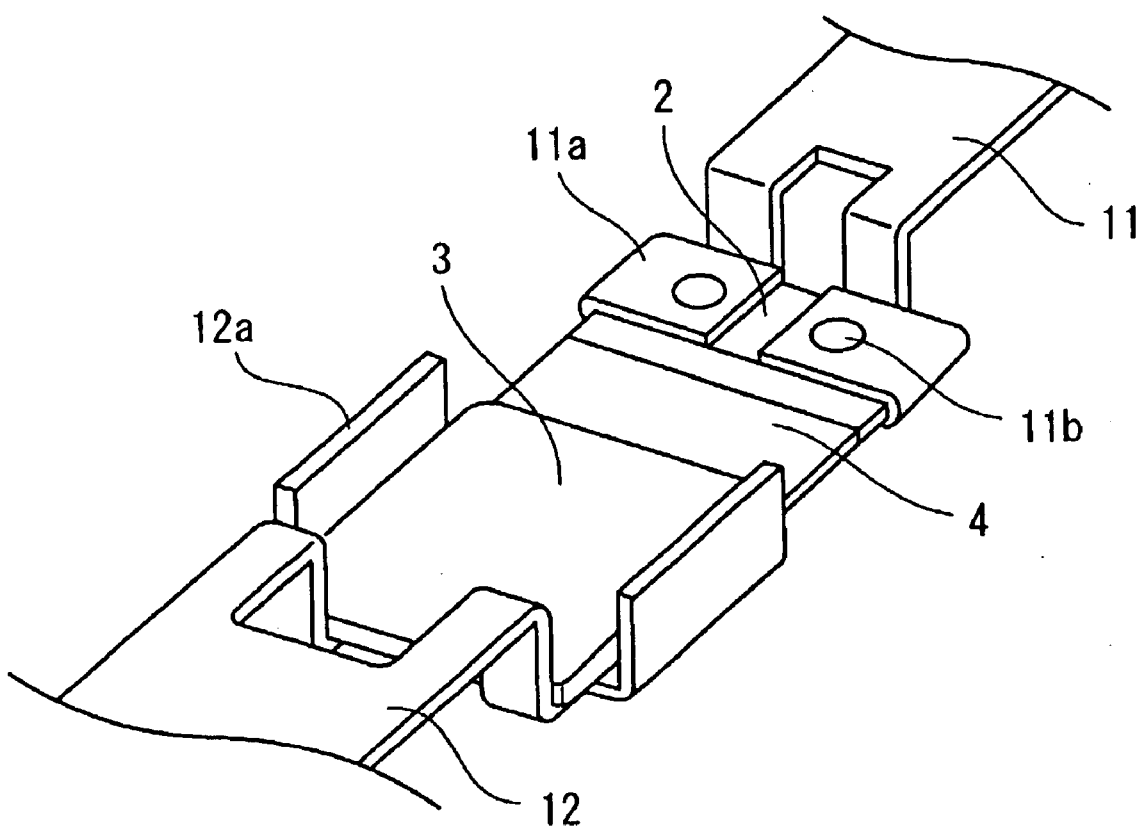
FIG. 11 is a perspective view of the capacitor element in a single state connected to lead frames according to a prior art.

FIG. 8 is a cross-sectional view of the structure of a solid electrolytic capacitor according to Embodiment 6 of the present invention. In FIG. 8, the cathode lead frame is indicated by 10, the stepped portions of the cathode lead frame 10 are indicated by 10e, and the guide portions for guiding the capacitor element 21 is not shown.

In Embodiment 6, the components are assembled so that a predetermined gap A is set between the stepped portions 10e of the cathode lead frame 10 and the end of the capacitor element 21. However, a limited gap A may suffice if the vertical part 10f of the stepped portion 10e and the end of the cathode member 3 are separated from each other by a resin constituting the casing resin 7 while expelling air from the spacing therebetween. It is not necessary to increase the gap A if this condition is satisfied.

As is apparent from Tables 1 and 2, changes in characteristics in each of Embodiments 1 to 6 of the present invention are small and the characteristics are stable. The changes in characteristics in Embodiment 1 are particularly small and the advantageous effects of the present invention are sufficiently clearly recognized in the case of Embodiment 1. In contrast, the changes in characteristics in the conventional item are markedly large.

What is claimed is:
1. A solid electrolytic capacitor comprising:
a capacitor element;
an anode member and a cathode member located in said capacitor element, said anode and cathode members respectively connected to an anode lead frame and a cathode lead frame, wherein the capacitor element including portions of the anode lead frame and the cathode lead frame are covered with a casing resin;

a stepped portion in a part of the cathode lead frame covered with the casing resin;

a fixing portion which abuts an end surface of the capacitor element, said fixing portion standing inside a vertical part of said stepped portion; and a gap located between the vertical part of said stepped portion and the end of the capacitor element on the cathode member side.

2. The solid electrolytic capacitor according to claim 1, wherein said fixing portion is integral with the cathode lead frame and comprises a bent, raised part of the cathode lead frame.

3. The solid electrolytic capacitor according to claim 2, wherein maid fixing portion comprises a same material as that of the cathode lead frame.

4. The solid electrolytic capacitor according to claim 1, wherein said fixing portion is separate from the cathode lead frame.

5. The solid electrolytic capacitor according to claim 1, wherein the vertical part of said stepped portion and the end of the capacitor element on the cathode member side are spaced apart from each other by the casing resin between the vertical part of said stepped portion and the end of the capacitor element.

6. The solid electrolytic capacitor according to claim 1, wherein the cathode lead frame comprises a plurality of bends defining a stepped shape comprising said plurality of steps.

7. The solid electrolytic capacitor according to claim 1, wherein the capacitor element comprises a stack of a plurality of capacitor elements.

8. The solid electrolytic capacitor according to claim 1, wherein the capacitor element comprises a sintered portion of powdered tantalum metal having a dielectric oxide film layer located on an external surface thereof, a solid electrolyte layer located on said oxide film layer and a cathode layer located on said electrolyte layer.

9. A method for manufacturing a solid electrolytic capacitor comprising:

connecting an anode member provided on a capacitor element by placing the anode member on an anode lead frame;

connecting a cathode member of the capacitor element by placing the cathode member on a cathode lead frame so that an end surface of the capacitor element on the cathode member side abuts against a fixing portion standing upright on the cathode lead frame; and covering the capacitor element including parts of the anode lead frame and the cathode lead frame with a casing resin.

* * * * *